United States Patent
Halbert et al.

(10) Patent No.: US 9,507,409 B2
(45) Date of Patent: Nov. 29, 2016

(54) TRANSITION RATE CONTROLLED BUS DRIVER CIRCUIT WITH REDUCED LOAD SENSITIVITY

(71) Applicant: TEXAS INSTRUMENTS INCORPORATED, Dallas, TX (US)

(72) Inventors: Joel Martin Halbert, Tucson, AZ (US); Vinay Agarwal, Tucson, AZ (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 643 days.

(21) Appl. No.: 13/923,339

(22) Filed: Jun. 20, 2013

(65) Prior Publication Data

US 2014/0380065 A1   Dec. 25, 2014

(51) Int. Cl.
G06F 13/14 (2006.01)
G06F 1/32 (2006.01)
G06F 13/38 (2006.01)

(52) U.S. Cl.
CPC ........... *G06F 1/3296* (2013.01); *G06F 13/385* (2013.01)

(58) Field of Classification Search
USPC .............. 710/305–317; 327/110, 63, 18, 541
See application file for complete search history.

(56) References Cited

U.S. PATENT DOCUMENTS

| | | | |
|---|---|---|---|
| 4,810,905 A | 3/1989 | Graham et al. | |
| 5,142,671 A | 8/1992 | Ishida et al. | |
| 5,309,036 A * | 5/1994 | Yang | H04L 25/0266 327/110 |
| 5,371,424 A * | 12/1994 | Quigley | H03K 19/01859 326/121 |
| 5,432,665 A * | 7/1995 | Hopkins | H03K 19/01721 361/18 |
| 8,324,935 B2 | 12/2012 | Boezen | |

* cited by examiner

*Primary Examiner* — Raymond Phan
(74) *Attorney, Agent, or Firm* — Gregory J. Albin; Frank D. Cimino

(57) ABSTRACT

A bus driver circuit (FIG. 2) is disclosed. The circuit includes a signal lead of a bus (200) and a reference terminal (Vss). A first transistor (MN0) has a first control terminal and has a first current path coupled to the reference terminal. A second transistor (MN1) has a second control terminal coupled to the first control terminal and has a second current path coupled between the signal lead and the reference terminal. A third transistor (MP0) is arranged to provide a first current through the first current path when the signal lead is in a first logic state (high). A fourth transistor (MP1) is arranged to apply a voltage to the second control terminal when the signal lead is in a second logic state (low).

20 Claims, 4 Drawing Sheets

TRANSITION RATE CONTROLLED BUS DRIVER CIRCUIT WITH REDUCED LOAD SENSITIVITY

BACKGROUND OF THE INVENTION

Embodiments of the present invention relate to a transition rate controlled bus driver circuit having reduced load capacitance sensitivity.

In wired digital communication systems with variable connection lengths and bus termination impedances there are challenging design limitations related to rise and fall time, power dissipation, and low and high output voltage levels. These limitations are further complicated by signal overshoot and inductive ringing which can cause interference between adjacent bus leads and communication errors. Frequently there must be a balance between bus circuit drive strength to control signal rise and fall times as well as to establish reliable logic levels after signal transitions. Some implementations may simply employ large n-channel and p-channel drive transistors with passive filter circuits, but these implementations are only effective for a limited range of bus loading. Other implementations may employ active current sources to achieve a controlled transition rate of a bus signal. However, these may be limited by power constraints.

Referring to FIG. 1, there is a simplified circuit diagram of a bus pull down circuit of the prior art. The circuit includes bus 100 and n-channel pull down transistor $M_{PD}$ 104. Feedback capacitor $C_{PD}$ 102 is coupled between the gate and drain of transistor $M_{PD}$. In operation, the gate of $M_{PD}$ is driven high by current source 106 to pull bus lead 100 low while current source 108 is off. Alternatively, the gate of $M_{PD}$ is driven low by current source 108 when bus lead 100 is to remain high while current source 106 is off. Although this circuit provides a controlled pull down rate of bus lead 100, switching time is limited by current source 106 and threshold voltage and process variation of transistor $M_{PD}$ 104.

While preceding approaches have provided improvements in bus switching and power consumption, the present inventors recognize that still further improvements are possible. Accordingly, the preferred embodiments described below are directed toward improving upon the prior art.

BRIEF SUMMARY OF THE INVENTION

In a preferred embodiment of the present invention, a bus drive circuit is disclosed. The circuit includes a signal lead of a bus and a reference terminal. A first transistor has a first control terminal and has a first current path coupled to the reference terminal. A second transistor has a second control terminal coupled to the first control terminal and has a second current path coupled between the signal lead and the reference terminal. A third transistor is arranged to provide a first current through the first current path when the signal lead is in a first logic state. A fourth transistor is arranged to apply a voltage to the second control terminal when the signal lead is in a second logic state.

DETAILED DESCRIPTION OF THE INVENTION

The preferred embodiments of the present invention provide significant advantages over bus driver circuits of the prior art as will become evident from the following detailed description.

Figure 1:
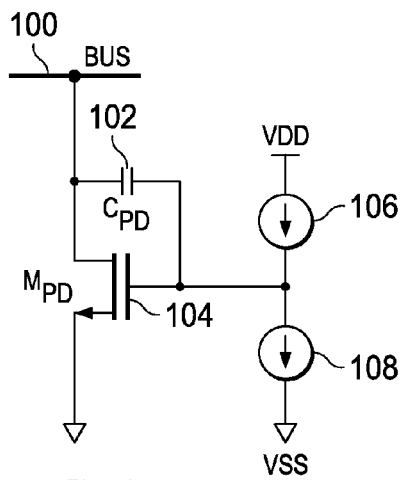
FIG. 1 is a circuit diagram of a bus pull down circuit of the prior art.
Figure 2:
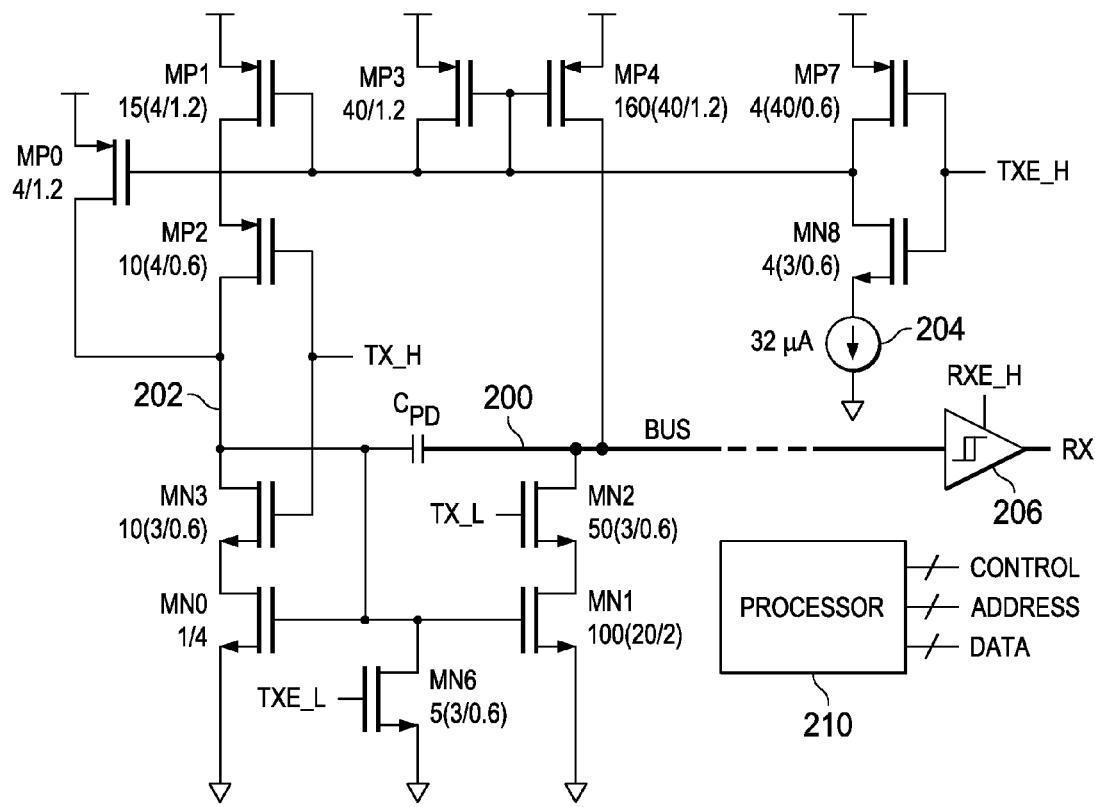
FIG. 2 is a circuit diagram of bus driver circuit of the present invention.

Referring to FIG. 2, there is a bus driver circuit of the present invention which may be used for driving bus leads or other loads having a wide range of capacitance and inductance. Here and in the following discussion bus 200 is shown as a single signal lead for the purpose of explanation. However, one of ordinary skill in the art will understand that many bus drive circuits and signal leads may be required on an integrated circuit to drive internal or external address, data, and control bus signals. The bus driver circuit of FIG. 2 is preferably operated by a processor 210 which produces control, address, and data signals. Control signals from processor 210 determine whether the bus driver circuit is to drive signals on bus 200 or whether another device may have control of the bus. Address and data signals determine the logic state of individual bus leads. Address and data signals transmitted on the bus driver circuit are received by remote bus receiver circuit 206, which may be a Schmidt trigger or buffer circuit enabled by receive signal RXE_H or other suitable receive circuit.

Transistor sizes of FIG. 2 are shown by way of example in the format X(W/L), where W is the width of a single transistor, L is the length of the transistor, and X is the number of parallel repetitions of the single transistor. Here and in the following discussion, the same reference names and numerals are used to indicate substantially the same circuit elements in the various drawing figures. In the example of FIG. 2, transistor names beginning with MP are p-channel metal oxide semiconductor (MOS) transistors. Transistors beginning with MN are n-channel MOS transistors. However, one of ordinary skill in the art having access to the instant specification will understand that bipolar transistors may be used rather than MOS transistors. Finally, short horizontal lines at the source of p-channel transistors represent a positive supply voltage terminal (Vdd). Correspondingly, triangles at the source of n-channel transistors represent a reference voltage such as Vss or ground.

The bus driver circuit of FIG. 2 includes a p-channel current mirror circuit formed by transistors MP0, MP1, MP3, and MP4. These transistors are typically operated in saturation with a same gate to source voltage so that their drain currents are relatively constant and proportional to their respective widths. The common gate of the p-channel current mirror circuit is connected to the common drain terminal of transistors MP7 and MN8. Transistors MP7 and MN8 have a common gate terminal that is coupled to receive enable signal TXE_H. When enable signal TXE_H is low, MP7 is on and MN8 is off. In this state, the common gate terminal of the p-channel current mirror circuit is coupled to Vdd, and the p-channel transistors of the current mirror circuit are off. Alternatively, when enable signal TXE_H is high, MP7 is off and MN8 is on. In this state, the common gate terminal of the p-channel current mirror circuit is coupled to Vss through current source 204. Current source 204 provides a small current of approximately 32 µA to achieve a bias voltage of the common gate terminal so that the p-channel transistors of the current mirror circuit operate in saturation.

The bus driver circuit of FIG. 2 also includes an n-channel current mirror circuit formed by transistors MN0 and MN1. These transistors are also operated in saturation with a same gate to source voltage so that their drain currents are relatively constant and proportional to their respective widths. The common gate of the n-channel current mirror circuit is connected to the drain terminal of transistor MN6. Transistor MN6 is coupled to receive enable signal TXE_L. When enable signal TXE_L is high and MN1 is on. In this state, the common gate terminal of the n-channel current mirror circuit is coupled to Vss, and the n-channel transistors of the current mirror circuit are off. Alternatively, when enable signal TXE_L is low, MN8 is off. In this state, the common gate terminal of the n-channel current mirror circuit is coupled to the drain of MP0, which provides a small current to achieve a bias voltage of the common gate terminal so that the n-channel transistors of the current mirror circuit operate in saturation.

When the bus driver circuit is enabled, data signal TX_H is applied to the gates of MP2 and MN3. When TX_H is high, MP2 is off and MN3 is on. In this state, the gate and drain of MN0 are connected to the drain of MP0 in a diode configuration. Thus, the gate on the n-channel current mirror is held at approximately an n-channel transistor threshold voltage ($V_{TN}$) above Vss. Alternatively, when TX_H goes low to pull bus lead 200 low, MP2 is on and MN3 is off. In this state, the gate of MN0 is connected to the drain of MP0 and MP1, and the drain of MN0 is open. The common gate terminal of the n-channel current mirror is coupled to bus lead 200 by capacitor $C_{PD}$. Data signal TX_L is also applied to the gate of MN2. When TX_L is low, MN2 is off and the drain of MN1 is open. When TX_L goes high MN2 turns on to couple bus lead 200 to the drain of MN1. The series connection of MN1 and MN2 is designed to sink more current than MP4 can source. Bus lead 200, therefore, is pulled low through MN1 and MN2 when TX_L goes high.

Figure 3A:
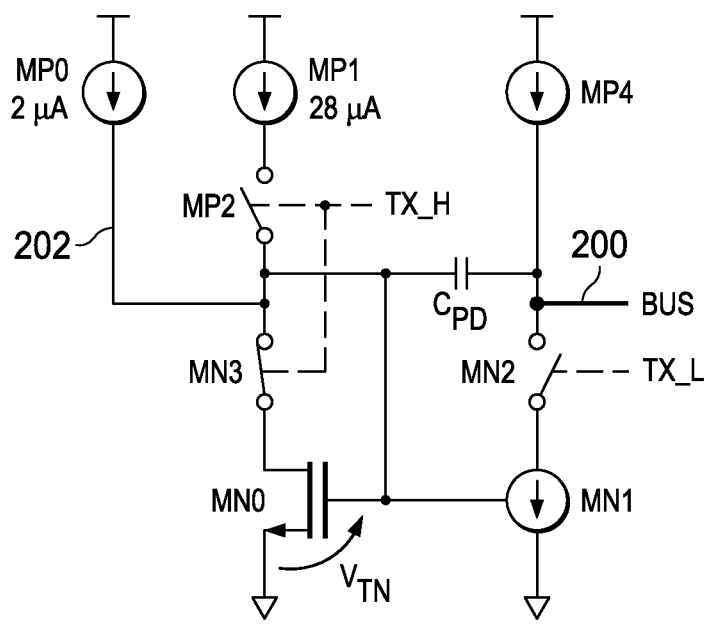
FIG. 3A is a circuit diagram showing operation of the present invention when a bus lead is driven to a high logic level.

Turning now to FIG. 3A, operation of the bus driver circuit of FIG. 2 will be explained when bus lead 200 is driven high to a first logic state. The same reference names and numerals are used in FIG. 3A for the same circuit elements of FIG. 2 as previously discussed. Data signals TX_H and TX_L are high and low, respectively, when bus lead 200 is driven high. In this state, MP2 is off and MN3 is on. MN0 is configured as an MOS diode with gate and drain connected to lead 202. MP0 provides a small current of approximately 2 µA to keep the common gate of MN0 and MN1 at approximately an n-channel threshold voltage $V_{TN}$ above Vss. MN2 is off so no current flows through MN1. MP4 is on and holds bus lead 200 at Vdd. This configuration is highly advantageous for several reasons. First, the circuit conducts only 2 µA through MP0 in steady state operation when bus lead 200 remains high. Second, MP4 holds bus lead 200 high without any steady state power dissipation. Third, the gate of MN1 is held at approximately $V_{TN}$, so any increase in gate voltage immediately begins a high to low transition of bus lead 200 without the time required for the control gate to reach $V_{TN}$.

Figure 3B:
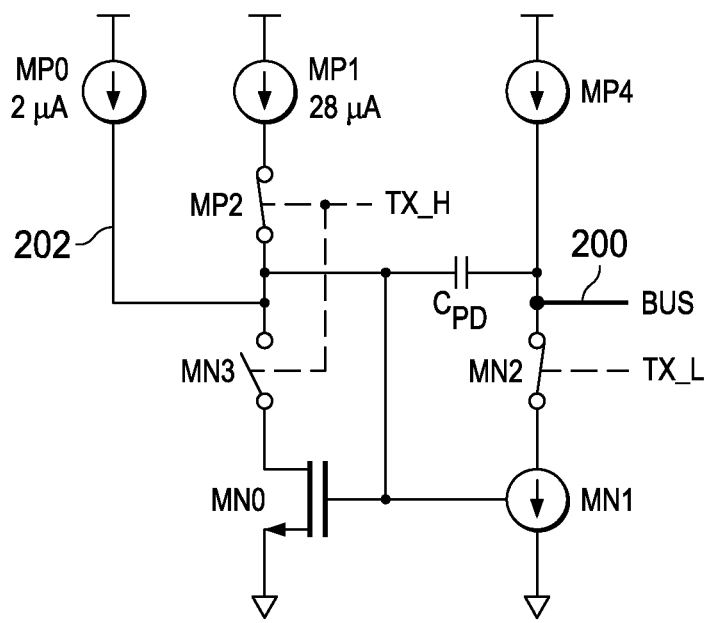
FIG. 3B is a circuit diagram showing operation of the present invention when the bus lead is driven to a low logic level.
Figure 4:
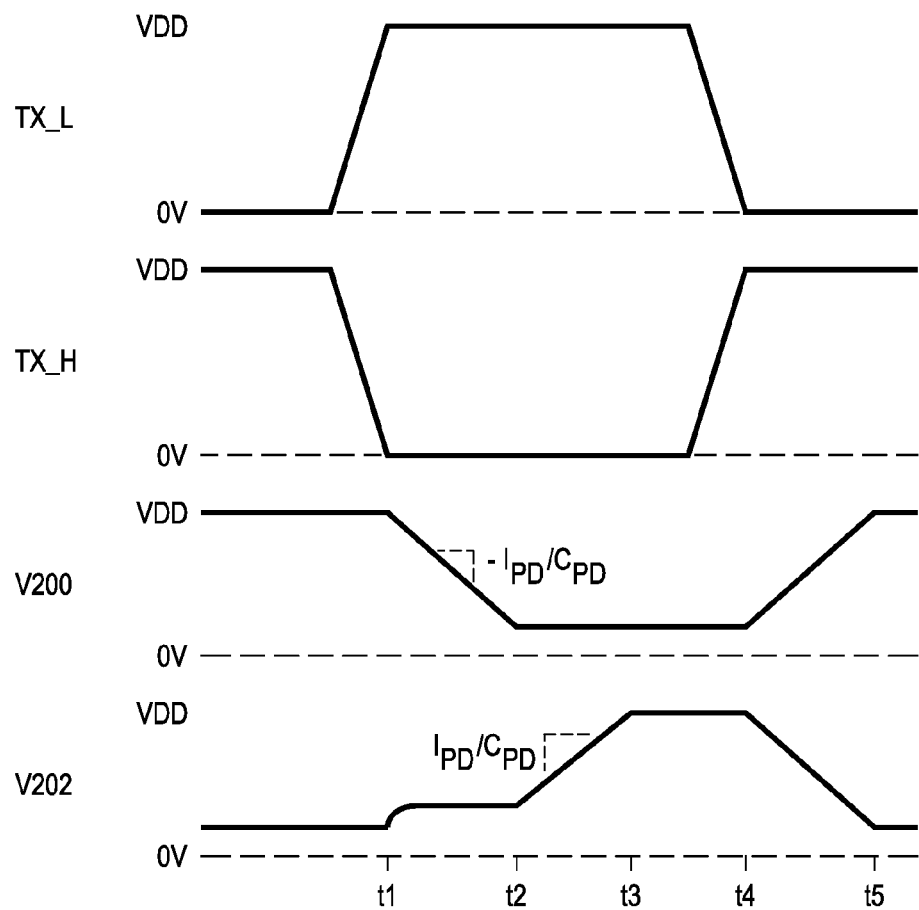
FIG. 4 is a timing diagram showing operation of the bus driver circuit of the present invention.

Referring next to FIG. 3B, operation of the bus driver circuit of FIG. 2 will be explained with reference to the timing diagram of FIG. 4 when bus lead 200 is driven low to a second logic state. At time t1, data signals TX_L and TX_H go high and low, respectively. The high level of TX_L turns on MN2, thereby connecting pull down transistor MN1 to bus lead 200. The low level of TX_H turns off MN3 and turns on MP2. In this state, the drain of MN0 is open and MN0, therefore, conducts no current. MP2 is on and the sum of current through MP0 (2 µA) and MP1 (28 µA) or $I_{PD}$ (30 µA) is applied to lead 202. This produces a slight increase in MN1 gate voltage to an equilibrium value. MN1 immediately begins to conduct current from MP4 and discharge bus lead 200. From time t1 to time t2 bus lead 200 discharges at a rate of $-I_{PD}/C_{PD}$. The transition rate of bus lead 200, therefore, is controlled by $I_{PD}$ and $C_{PD}$ and is substantially linear. This is because MN1 operates in saturation and the gate of MN1 remains at an equilibrium voltage, so the current $I_{PD}$ through $C_{PD}$ is equal to $C_{PD} \cdot dV200/(t2-t1)$. Thus, $-I_{PD}/C_{PD}$ is equal to $dV200/(t2-t1)$. At time t2, bus lead 200 achieves an output low value and is received by bus receiver 206. Subsequently, V202 increases linearly from time t2 to time t3 as current $I_{PD}$ charges $C_{PD}$. As the gate voltage of MN1 reaches Vdd, bus lead 200 reaches a minimum output low value ($V_{OL}$). From time t3 to time t4 MN1 operates in the linear region to hold bus lead 200 at $V_{OL}$. At time t4, data signals TX_L and TX_H go low and high, respectively. The low level of TX_L turns off MN2 and current through MP4 charges bus lead 200 linearly to Vdd at time t5. The high level of TX_H turns MN3 on and MP2 off. MN0 is once again configured as an MOS diode and operates in saturation to discharge lead 202 linearly to $V_{TN}$ at time t5.

Several advantages of the present invention are apparent from the foregoing discussion. First, the control gate of pull down transistor MN1 begins at $V_{TN}$. Thus, the high to low transition of bus lead 200 begins immediately with the transition of data signals TX_L and TX_H. Second, all transitions of bus lead 200 are linear and are driven by a relatively constant current from either the p-channel current mirror (MP4) or the n-channel current mirror (MN1). This greatly reduces inductive ringing and overshoot during bus transitions, because the ringing is equal to a product of bus inductance and a rate of change of current with time ($L_{BUS} \cdot di/dt$). Since transition current is approximately constant, ringing and overshoot are small. Third, the transition rate of bus lead 200 is controlled by the selection of MP0 and MP1 ($I_{PD}$) and $C_{PD}$ and is, therefore, substantially independent of load capacitance for a wide range of values. Finally, the bus drive circuit dissipates virtually no steady state power. Moreover, power dissipation during signal transitions only occurs for a brief time until remote bus receiver 206 receives the data on bus lead 200.

Figure 5A:
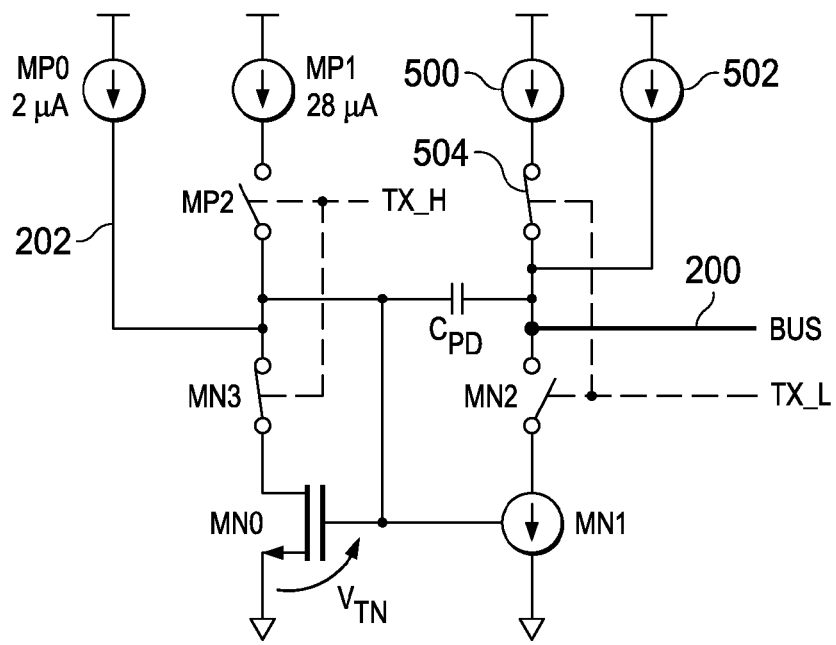
FIG. 5A is a circuit diagram showing operation of an alternative embodiment of the present invention when the bus lead is driven to a high logic level.
Figure 5B:
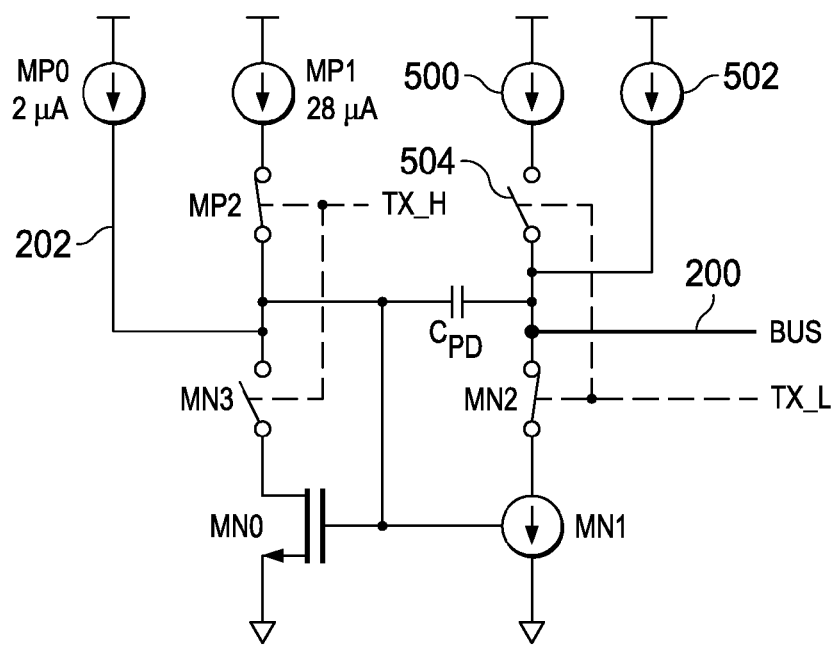
FIG. 5B is a circuit diagram showing operation of the alternative embodiment of the present invention when the bus lead is driven to a low logic level.

Referring next to FIGS. 5A and 5B, there is an alternative embodiment of the present invention, wherein p-channel transistor MP4 is divided into two p-channel transistors or current sources 500 and 502. P-channel transistor 504 is added in series with transistor 500 and controlled by data signal TX_L. As previously described, when bus lead 200 remains high data signal TX_L remains low. The low level of TX_L turns off MN2 and turns on p-channel transistor 504. Thus, p-channel transistors 500 and 502 provide current to drive bus lead 200 from a second logic state (low) to a first logic state (high). This is equivalent to the previously described embodiment of FIG. 3A. A low to high transition of data signal TX_L (FIG. 5B) subsequently turns on MN2 and turns off p-channel transistor 504. In this state, pull down transistor MN1 must only sink current from p-channel transistor 502 and discharge bus lead 200. Thus, power dissipation is further reduced during high to low signal transitions of bus lead 200.

Still further, while numerous examples have thus been provided, one skilled in the art should recognize that various modifications, substitutions, or alterations may be made to the described embodiments while still falling within the inventive scope as defined by the following claims. For example, in the circuit of FIG. 3A the control gate of n-channel transistor MN1 is biased at approximately a threshold voltage $V_{TN}$ above Vss. In an alternative embodiment of the present invention, the control gate of n-channel transistor MN1 may be biased slightly below the threshold voltage $V_{TN}$ by making the channel length of n-channel transistor MN0 less than the channel length of MN1. The short channel effect of MN0 provides a bias voltage slightly less than $V_{TN}$ so that n-channel transistor MN1 remains off while control signal TX_H is high. In this embodiment, n-channel transistor MN2 and control signal TX_L may be eliminated, and the drain of n-channel transistor MN1 may be directly connected to the drain of p-channel transistor MP4. Moreover, although individual transistors are used as switching devices, one of ordinary skill in the art will understand that transmission gates or other suitable switching devices may also be used. Other combinations will be readily apparent to one of ordinary skill in the art having access to the instant specification.

What is claimed is:

1. A circuit, comprising:
  a signal lead;
  a reference terminal;
  a first transistor having a first control terminal and having a first current path coupled to the reference terminal;
  a second transistor having a second control terminal coupled to the first control terminal and having a second current path coupled between the signal lead and the reference terminal;
  a third transistor arranged to provide a first current through the first current path when the signal lead is in a first logic state; and
  a fourth transistor arranged to apply a voltage to the second control terminal when the signal lead is in a second logic state.

2. The circuit of claim 1, wherein the first transistor is configured as a diode when the signal lead is in the first logic state.

3. The circuit of claim 1, comprising a capacitor coupled between the signal lead and the second control terminal.

4. The circuit of claim 1, wherein the third and fourth transistors are connected as current mirrors when the signal lead is in the second logic state.

5. The circuit of claim 1, comprising a fifth transistor arranged to apply a voltage to the signal lead when the signal lead is in the first logic state and to apply a current to the signal lead during a transition from the second logic state to the first logic state.

6. The circuit of claim 1, wherein the second control terminal receives a voltage less than a threshold voltage when the signal lead is in the first logic state, and wherein the second control terminal receives a voltage greater than a threshold voltage when the signal lead is in the second logic state.

7. The circuit of claim 1, comprising:
  a fifth transistor arranged to apply a current to the signal lead during a transition between the first and second logic states; and
  a sixth transistor arranged to apply a current to the signal lead only in the first logic state or during a transition from the second logic state to the first logic state.

8. The circuit of claim 3, wherein the third and fourth transistors supply respective currents through the capacitor during a transition of the signal lead between the first and second logic states.

9. The circuit of claim 7, wherein the fifth and sixth transistors are connected as current mirrors during a transition from the second logic state to the first logic state.

10. A circuit, comprising:
  a signal lead;
  a reference terminal;
  a first transistor having a first control terminal and having a first current path coupled to the reference terminal;
  a second transistor having a second control terminal coupled to the first control terminal and having a second current path coupled between the signal lead and the reference terminal;
  a third transistor arranged to provide a first current to the signal lead when the signal lead is in a first logic state or a second logic state; and
  a fourth transistor arranged to provide a second current to the signal lead only when the signal lead is in the first logic state or during a transition from the second logic state to the first logic state.

11. The circuit of claim 10, wherein the first transistor is configured as a diode when the signal lead is in the first logic state.

12. The circuit of claim 10, comprising a capacitor coupled between the signal lead and the second control terminal.

13. The circuit of claim 10, comprising:
  a fifth transistor arranged to provide a third current through the first current path when the signal lead is in the first logic state; and
  a sixth transistor arranged to apply a voltage to the second control terminal when the signal lead is in the second logic state.

14. The circuit of claim 13, wherein fifth and sixth transistors are connected as current mirrors when the signal lead is in the second logic state.

15. The circuit of claim 10, wherein the first current is less than the second current.

16. A computer system, comprising:
  a processor arranged to produce a data signal;
  a signal lead;
  a reference terminal;
  a first transistor having a first control terminal and having a first current path coupled to the reference terminal;
  a second transistor having a second control terminal coupled to the first control terminal and having a second current path coupled between the signal lead and the reference terminal;
  a third transistor arranged to provide a first current through the first current path when the data signal is in a first logic state; and
  a fourth transistor arranged to apply a voltage to the second control terminal when the data signal is in a second logic state.

17. The computer system of claim 16, wherein the first transistor is configured as a diode when the data signal is in the first logic state.

18. The computer system of claim 16, comprising a capacitor coupled between the signal lead and the second control terminal.

19. The computer system of claim 18, wherein third and fourth transistors supply respective currents through the capacitor during a transition of the data signal between the first and second logic states.

20. The computer system of claim 16, comprising:
   a fifth transistor arranged to apply a current to the signal lead in response to the first or second logic states of the data signal; and
   a sixth transistor arranged to apply a current to the signal lead only in a first logic state of the data signal or during a transition from the second logic state to the first logic state of the data signal.

* * * * *